(12) United States Patent
Steinbuchel, IV (10) Patent No.: US 11,557,854 B2
(45) Date of Patent: Jan. 17, 2023

(54) ELECTRIC CABLE ASSEMBLY

(71) Applicant: Webasto Charging Systems, Inc., Monrovia, CA (US)

(72) Inventor: Herman Joseph Steinbuchel, IV, Pasadena, CA (US)

(73) Assignee: WEBASTO CHARGING SYSTEMS, INC., Monrovia, CA (US)

( * ) Notice: Subject to any disclaimer, the term of this patent is extended or adjusted under 35 U.S.C. 154(b) by 0 days.

(21) Appl. No.: 17/226,808

(22) Filed: Apr. 9, 2021

(65) Prior Publication Data

US 2022/0329005 A1     Oct. 13, 2022

(51) Int. Cl.
*H01R 13/58*     (2006.01)
*H01R 13/56*     (2006.01)

(52) U.S. Cl.
CPC ....... *H01R 13/5845* (2013.01); *H01R 13/562* (2013.01)

(58) Field of Classification Search
CPC ........... H01R 13/5845; H01R 13/5841; H01R 13/5833; H01R 13/585; H01R 13/562; H01R 13/56
USPC ......................................................... 439/606
See application file for complete search history.

(56) References Cited

U.S. PATENT DOCUMENTS

| | | | | |
|---|---|---|---|---|
| 4,582,388 A * | 4/1986 | Swaffield | ............... | H01J 29/925 439/909 |
| 5,137,470 A * | 8/1992 | Doles | ................... | H01R 24/564 439/578 |
| 5,167,533 A * | 12/1992 | Rauwolf | ............... | H01R 24/566 439/583 |
| 5,908,327 A * | 6/1999 | Tsuji | ...................... | H01R 24/84 439/470 |
| 5,967,830 A * | 10/1999 | Tsuji | .................... | H02G 3/0691 439/470 |
| 6,280,208 B1 * | 8/2001 | Masuda | ................. | H02K 11/40 174/382 |
| 6,406,314 B1 * | 6/2002 | Byrne | .................... | H02G 3/288 439/446 |
| 7,186,133 B1 * | 3/2007 | Szczesny | ............. | H01R 13/567 439/446 |
| 7,189,115 B1 * | 3/2007 | Montena | .............. | H01R 9/0524 439/584 |

(Continued)

FOREIGN PATENT DOCUMENTS

EP               1837886 B1     3/2011

OTHER PUBLICATIONS

International Search Report and Written Opinion for PCT/US2022/017231, dated May 19, 2022.

*Primary Examiner* — Harshad C Patel
(74) *Attorney, Agent, or Firm* — Concept IP LLP; Michael Zarrabian (57) ABSTRACT

An electric cable assembly includes an electric cable having a cable jacket and one or more electrical wires extending through the cable jacket, the cable jacket defining one or more retention structures arranged at an outer surface of the cable jacket; and a sleeve adapted to connect to an electrical connector and surrounding the cable jacket in an area outside the electrical connector, the sleeve including one or more engagement structures engaged with the one or more retention structures, where the engagement of the one or more retention structures with the one or more engagement structures facilitates a retention of the sleeve with the cable jacket.

10 Claims, 9 Drawing Sheets

(56) References Cited

U.S. PATENT DOCUMENTS

| | | | |
|---|---|---|---|
| 7,249,969 B2* | 7/2007 | Paynter | H01R 13/5837 |
| | | | 439/578 |
| 7,507,108 B2* | 3/2009 | Tsuji | H01R 13/5841 |
| | | | 439/446 |
| 8,113,878 B2* | 2/2012 | Clausen | H01R 24/564 |
| | | | 439/584 |
| 8,323,056 B2* | 12/2012 | Clausen | H01R 24/564 |
| | | | 439/584 |
| 9,698,522 B2 | 7/2017 | Markefka | |
| 9,941,609 B2* | 4/2018 | Paynter | H01R 9/0521 |
| 10,873,166 B2* | 12/2020 | Hughes | H01R 13/622 |
| 2005/0197010 A1* | 9/2005 | Ching | H01R 24/28 |
| | | | 439/606 |
| 2010/0178800 A1* | 7/2010 | Clausen | H01R 24/564 |
| | | | 29/857 |
| 2011/0053421 A1* | 3/2011 | Mostoller | H01R 13/562 |
| | | | 439/625 |
| 2012/0171896 A1* | 7/2012 | Csak | H01R 13/504 |
| | | | 439/606 |
| 2014/0045357 A1 | 2/2014 | Nugent | |
| 2014/0106617 A1* | 4/2014 | Csak | H01R 13/5845 |
| | | | 439/606 |

* cited by examiner

ELECTRIC CABLE ASSEMBLY

TECHNICAL FIELD

Embodiments relate generally to an electrical cable assembly connected to an electrical connector, and more particularly to an electrical cable assembly having an overmolded bend relief mechanically connected to an electric cable.

BACKGROUND

Strain relief or bending protection sleeves may be arranged over a cable to prevent damage to the cable in a transition region to an electrical connector housing. Generally, these sleeves are formed by molding the sleeve over the cable. However, the sleeve may not properly bond to the cable and may slide or rotate relative to the cable, limiting the sleeve's intended function, which is undesirable. In many cases, the sleeve may initially bond to the cable, but may later become at least partially detached through use.

SUMMARY

An electric cable assembly embodiment may include: an electric cable having a cable jacket and one or more electrical wires extending through the cable jacket, the cable jacket defining one or more retention structures arranged at an outer surface of the cable jacket; and a sleeve adapted to connect to an electrical connector and surrounding the cable jacket in an area outside the electrical connector, the sleeve including one or more engagement structures engaged with the one or more retention structures, where the engagement of the one or more retention structures with the one or more engagement structures facilitates a retention of the sleeve with the cable jacket.

In additional electric cable assembly embodiments, the one or more retention structures may be one or more grooves arrayed along a length of the cable jacket, where each groove extends circularly around a central axis of the cable. In additional electric cable assembly embodiments, the one or more engagement structures may be one or more protrusions arrayed along a length of the sleeve, where each protrusion extends inside an associated groove. In additional electric cable assembly embodiments, the cable jacket includes one or more anti-rotational structures extending inside the one or more grooves to restrict a rotation of the sleeve relative to the cable jacket. In additional electric cable assembly embodiments, one or more anti-rotational structures are arranged inside each groove.

In additional electric cable assembly embodiments, the sleeve may be formed by molding the sleeve over the cable jacket. In additional electric cable assembly embodiments, the sleeve may be made of thermoplastic elastomeric material. In additional electric cable assembly embodiments, the one or more retention structures may be provided on the cable jacket by a hot stamping process.

A method embodiment for forming an electric cable assembly may include: providing an electrical cable having a cable jacket and one or more wires extending through the cable jacket; positioning a portion of the cable jacket inside a die assembly; and forming one or more retention structures at an outer surface of the cable jacket by heating the portion of the cable jacket arranged inside the die assembly and applying pressure on the die assembly.

Additional method embodiments may include: molding a sleeve over the cable jacket, where one or more engagement structures may be formed during molding of the sleeve. In additional method embodiments, the one or more retention structures may be one or more grooves arrayed along a length of the cable jacket, where each groove extends circularly around a central axis of the cable. In additional method embodiments, the one or more engagement structures may be one or more protrusions arrayed along a length of the sleeve.

In additional method embodiments, the die assembly includes a pair of die portions, each die portion defines a cut-out to receive and surround the portion of the cable, where each die portion includes one or more protrusions arranged inside the associated cut-out and arrayed along a length of the cut-out, and where the one or more protrusions facilitates formation of the one or more grooves. In additional method embodiments, the die assembly includes one or more heaters embedded inside each die portion. In additional method embodiments, each protrusion of each die portion includes a pair of chamfers defined at lateral ends of the protrusion, where the pair of chamfers facilitates a formation of one or more anti-rotational structures on the cable jacket.

A system embodiment may include: an electric cable having a cable jacket and one or more electrical wires extending through the cable jacket, the cable jacket defining one or more retention structures arranged at an outer surface of the cable jacket; and a sleeve adapted to connect to an electrical connector and surrounding the cable jacket in an area outside the electrical connector, where an engagement of the one or more retention structures with the sleeve facilitates a retention of the sleeve with the cable jacket, and where an engagement of the one or more retention structures with the sleeve facilitates a retention of the sleeve and cable jacket with the electrical connector.

In additional system embodiments, a compression of the sleeve onto the electric cable at connection of the sleeve to the electrical connector forms one or more engagement structures at an inner surface of the sleeve. In additional system embodiments, the one or more engagement structures of the sleeve engage with the one or more retention structures of the cable jacket to facilitate the retention of the sleeve with the cable jacket.

Additional system embodiments may include: a die assembly comprising one or more portions. In additional system embodiments, each portion of the die assembly may include: a semi-cylindrical cut-out extending from a first longitudinal end to a second longitudinal end, where the semi-cylindrical cut-out may be configured to receive a portion of the electric cable; one or more protrusions arranged inside the cut-out, where the one or more protrusions are configured to form the one or more retention structures arranged at an outer surface of the cable jacket; and one or more heaters disposed proximate the semi-cylindrical cut-out, where the one or more heaters are configured to heat the one or more protrusions for forming the one or more retention structures arranged at an outer surface of the cable jacket.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present system allows for a desired retention of an over-molded sleeve on a cable connected to an electrical connector, where the sleeve is arranged at a transition region of the cable from a housing of the electrical connector.

Figure 1:
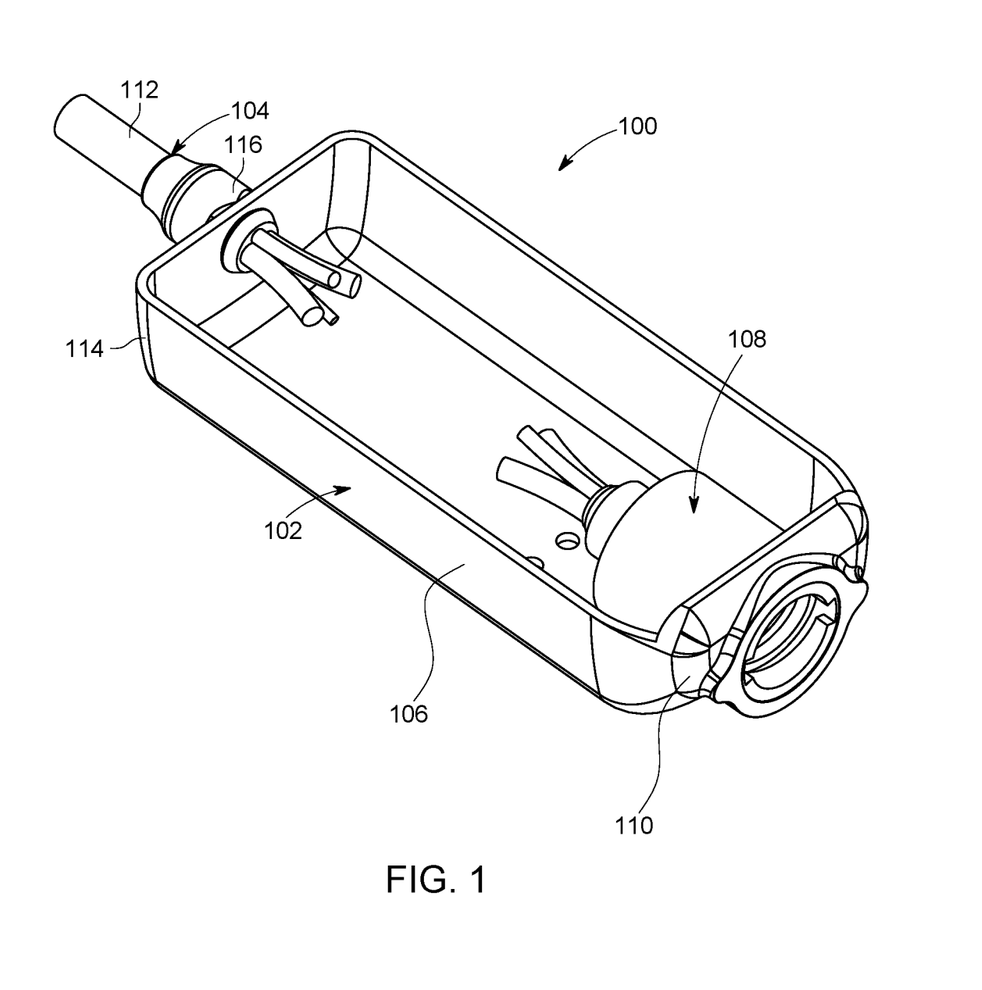
FIG. 1 depicts an electrical connector assembly having an electrical connector and an electric cable assembly connected to the electric connector, according to an embodiment of the disclosure.

Referring to FIG. 1, an electrical connector assembly 100 is shown, according to an embodiment of the disclosure. The electrical connector assembly 100 includes an electrical connector 102 connected to an electric cable assembly 104 (hereinafter referred to as cable assembly 104). The electrical connector 102 includes a housing 106 that may include various electrical circuits or components, such as, but not limited to, a processor, a charge controller, a fault detector, etc., to facilitate a safe supply of current to an electric vehicle (not shown). The electrical connector 102 may include a socket 108 arranged at a first end 110 of the housing 106 and partially extending outwardly from the housing 106. The socket 108 may include a plurality of pins or receptacles (not shown) to facilitate an electrical connection of an electrical equipment to an electrical source.

As shown in FIG. 1, the cable assembly 104 includes an electric cable 112 connected to the housing 106 and extending outwardly from an inside of the housing 106. The electric cable 112 (hereinafter referred to as cable 112) exits the housing through an opening defined at a second end 114 of the housing 106. The cable assembly 104 further includes an over-molded sleeve 116 arranged surrounding the cable 112 and extending in a longitudinal direction from the second end 114 of the housing 106. The over-molded sleeve 116 acts as a bend relief and reduces stress in the cable 112 due to any bending of the cable 112 proximate a junction of the cable 112 and housing 106. In one embodiment, the sleeve 116 increases a minimum bend radius of cable and therefore restricts bending of the cable 112 beyond a certain minimum radius. In some embodiments, the sleeve 166 may be made of thermoplastic elastomeric material, such as Santoprene™. In one embodiment, the sleeve may be made of thermoplastic vulcanized material, cross-linked rubber, or the like.

Figure 2:
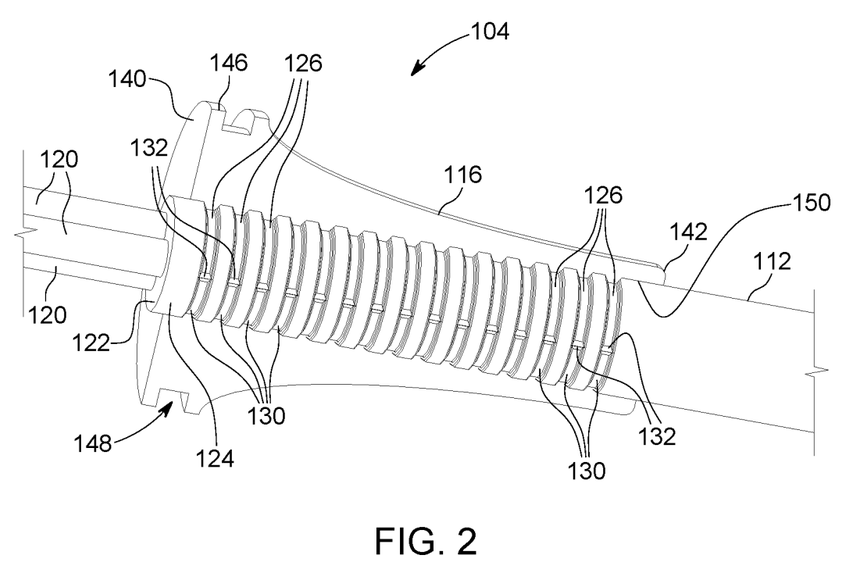
FIG. 2 depicts a sectional perspective view of the electric cable assembly of FIG. 1 depicting a section of a sleeve attached to an electric cable, according to an embodiment of the disclosure.
Figure 3:
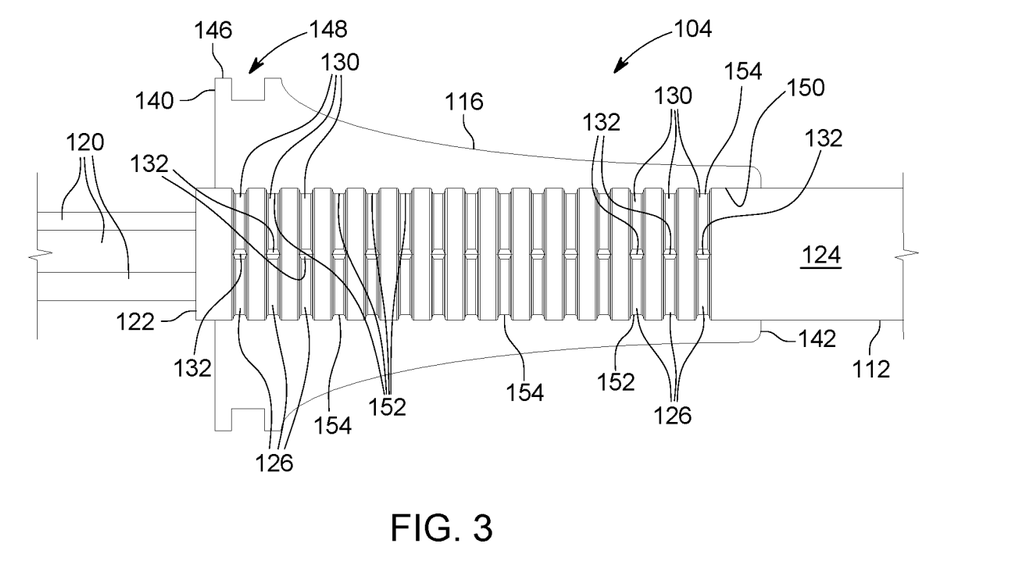
FIG. 3 depicts a front view of FIG. 2 depicting a plurality of retention structures of the electric cable engaged and interlocked with a plurality of engagement structures of the sleeve, according to an embodiment of the disclosure.
Figure 4:
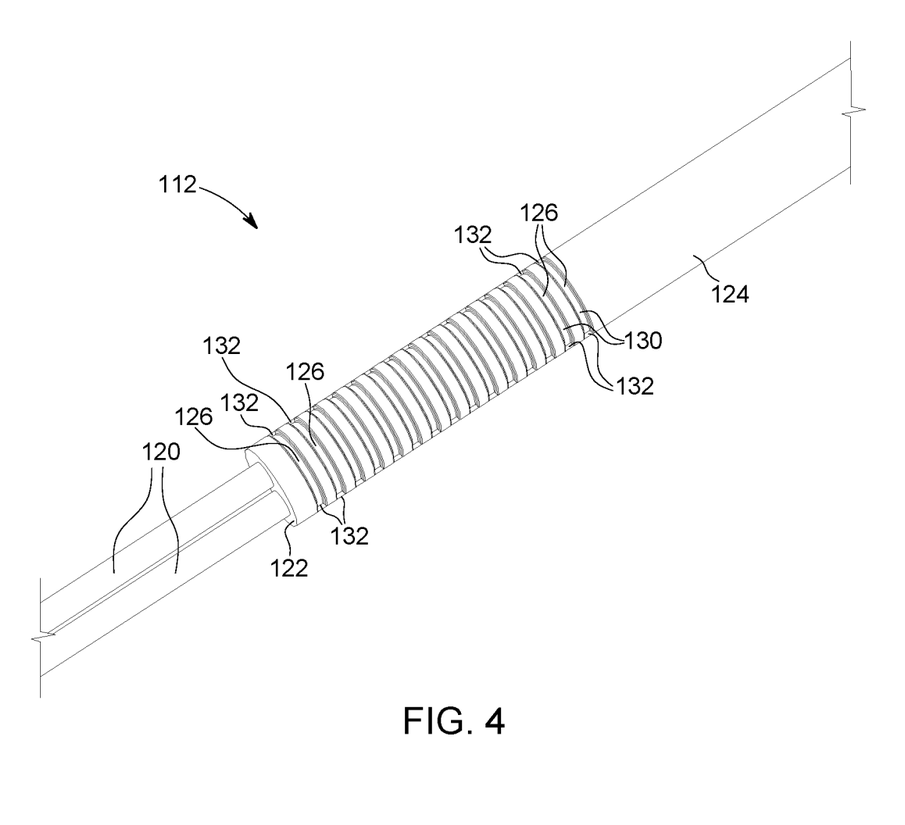
FIG. 4 depicts the electric cable having the plurality of retention structures, according to an embodiment of the disclosure.

Referring to FIGS. 2-4, the electrical cable 112 includes a plurality of electrical wires 120 and a cable jacket 122 arranged surrounding the electrical wires 120. The cable jacket 122 may be made of an insulation material and the electrical wires 120 may be arranged inside the cable jacket 122. In one embodiment, the cable jacket 122 is made of thermoplastic elastomer. As shown, the cable jacket 122 includes a cylindrical structure defining at least one channel through which the electrical wires 120 extend and an outer surface 124 to which the sleeve 116 is attached. As shown, the cable jacket 122 includes a plurality of retention structures 126 disposed at the outer surface 124 of the cable to facilitate retention of the sleeve 116 on the cable jacket 122. The electrical cable 112 remains secured to the jacket 116 via the plurality of retention structures 126.

In the illustrated embodiment, the plurality of retention structures 126 is a plurality of grooves 130 defined by the outer surface 124 of cable jacket 122. As shown, the grooves 130 are circular grooves and are arrayed in a longitudinal direction. It may be appreciated that each groove 130 is arranged at a longitudinal distance from an adjacent groove, and the grooves 130 are arrayed along a length of the cable jacket 122 that is equal to smaller than a length of the sleeve 116. Although the retention structures 126 are shown and contemplated as the circular grooves 130, it may be envisioned that the retention structures 126 may be dimples, linear grooves arrayed circularly around a central axis of the cable 112 and extending in a longitudinal direction, indentations, spiral grooves, valleys, knurled surface, or any other suitable structures or features defined on the outer surface 124 that facilitates positive retention and securing of the over-molded sleeve 116 with the cable jacket 112. In an embodiment, a depth of each groove 130 is less than half of a thickness of the cable jacket 112.

In some embodiments, the cable jacket 122 may include a plurality of anti-rotation structures 132 for preventing a rotation of the sleeve 116 relative to the cable jacket 122 about the central axis of the cable 112. In one embodiment, the anti-rotation structures 132 are protrusions or ridges arranged inside each of grooves 130. As shown in FIG. 4, two anti-rotation ridges 132 are disposed inside each groove 130, bifurcating each groove 130 into two halves, for example, a first grove section and a second groove section. The two anti-rotation structures 132 are arranged diametrically opposite to each other. Although two anti-rotation structures 132 corresponding to each groove 130 are contemplated, it may be appreciated that more than two anti-rotation structures 132 corresponding to each groove 130 is also possible. Further, the cable jacket 122 may include additional features or structures to prevent sliding of the sleeve 116 relative to the cable jacket 122.

In some embodiments, the sleeve 116 may not be molded over the cable jacket 122. In some embodiments, the sleeve 116 may be separately molded and the inner surface 150 of the sleeve 116 may be forced into engagement with the plurality of retention structures 126 of the cable jacket 122 by the compression of the sleeve 116 by the insertion of the sleeve 116, cable jacket 122, and/or cable assembly 104 into a hole in the housing (See FIG. 1).

In some embodiments, the plurality of grooves 130 in the sleeve 116 may not exist in the sleeve 116 before the sleeve 116, cable jacket 122, and/or cable assembly 104 are inserted into the hole in the housing (See FIG. 1). Inserting the sleeve 116, cable jacket 122, and/or cable assembly 104 into the hole in the housing (See FIG. 1) may compress the sleeve 116 into the retention structures 126 in the cable jacket 122 and would force the sleeve 116 to engage with the retention structures 126 in the cable jacket 122. In some embodiments, the sleeve 116 may have an inner surface that is configured to engage with the retention structures 126 in the cable jacket 122 when a force is applied to the sleeve, such as when the cable assembly 104 is fit into an opening or aperture having a small diameter that causes compression of the sleeve 116 into the cable jacket 122.

As shown in FIGS. 2-3, the sleeve 116 includes a first longitudinal end 140 adapted to connect to the electrical connector 102 (i.e., the housing 106) and a second longitudinal end 142 adapted to arrange distally from the housing 106. The sleeve 116 includes a shoulder portion 146 arranged at the first longitudinal end 140 and defines a cut-out 148 extending circularly around a circumference of the shoulder portion 146. The cut-out 148 facilitates an attachment or engagement of the sleeve 116 with the electrical connector 102 (i.e., the housing 106). Further, as shown, the sleeve 116 includes an inner surface 150 engaged with the outer surface 124 of the cable jacket 122. Moreover, as shown, an outer diameter of the sleeve 116 decreases from the shoulder portion 146 to the second longitudinal end 142 of the sleeve 116.

Moreover, the sleeve 116 includes a plurality of engagement structures 152 arranged at the inner surface 150 of the sleeve 116 and engaged with the plurality of retention structures 126. In the illustrated embodiment, the engagement structures 152 are circular protrusions 154 extending radially inwardly from the inner surface 150 of the sleeve 116 and arranged inside the plurality of grooves 130. As shown, the protrusions 154 are arrayed in a longitudinal direction along the length of the sleeve 116, and each protrusion 154 extends circularly along an inner circumference of the sleeve 116. Although circularly extending protrusions 154 are contemplated as the engagement structures 152, it may be envisioned that the engagement structures 152 may be longitudinally extending protrusions or any other suitable structures complementary to the retention structures 126 and arranged/patterned on the inner surface 150 of the sleeve 116 to engage and interlock with the retention structures 126 to enable the secure retention of the over-molded sleeve 116 on the cable jacket 122.

A method for forming/manufacturing the cable assembly 104 may include providing a cable 112 having a plurality of electrical wires 120 arranged inside a cable jacket 122. The method further includes providing or forming the plurality of retention structures 126 on the outer surface 124 of the cable jacket 122 at a location that may be arranged proximate to the electrical connector 102 and includes a transition area of the cable 112 that is adapted to bend. In an embodiment, a formation of the plurality of grooves 130 as the plurality of retention structures 126 is explained. In an embodiment, the grooves 130 are formed or provided by a hot stamping process. For stamping the grooves 130 at a desired location or area of the cable jacket 122, the desired area of the cable 112 is arranged inside a suitable die assembly 200 (shown in FIG. 5).

Figure 5:
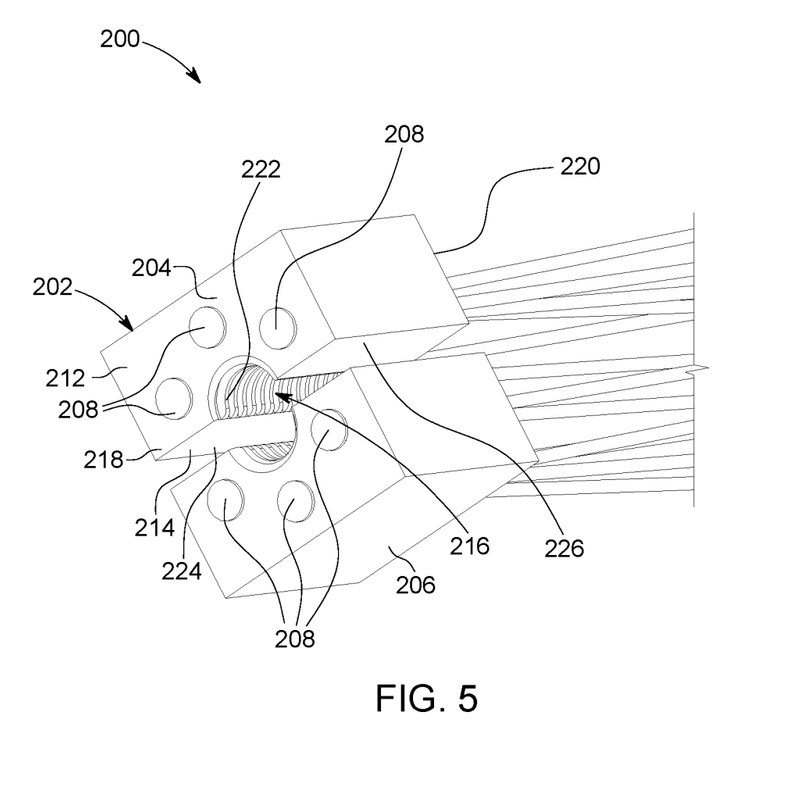
FIG. 5 depicts a die assembly adapted to facilitate a formation of the retention structures on a cable jacket of the electric cable, according to an embodiment of the disclosure.
Figure 6:
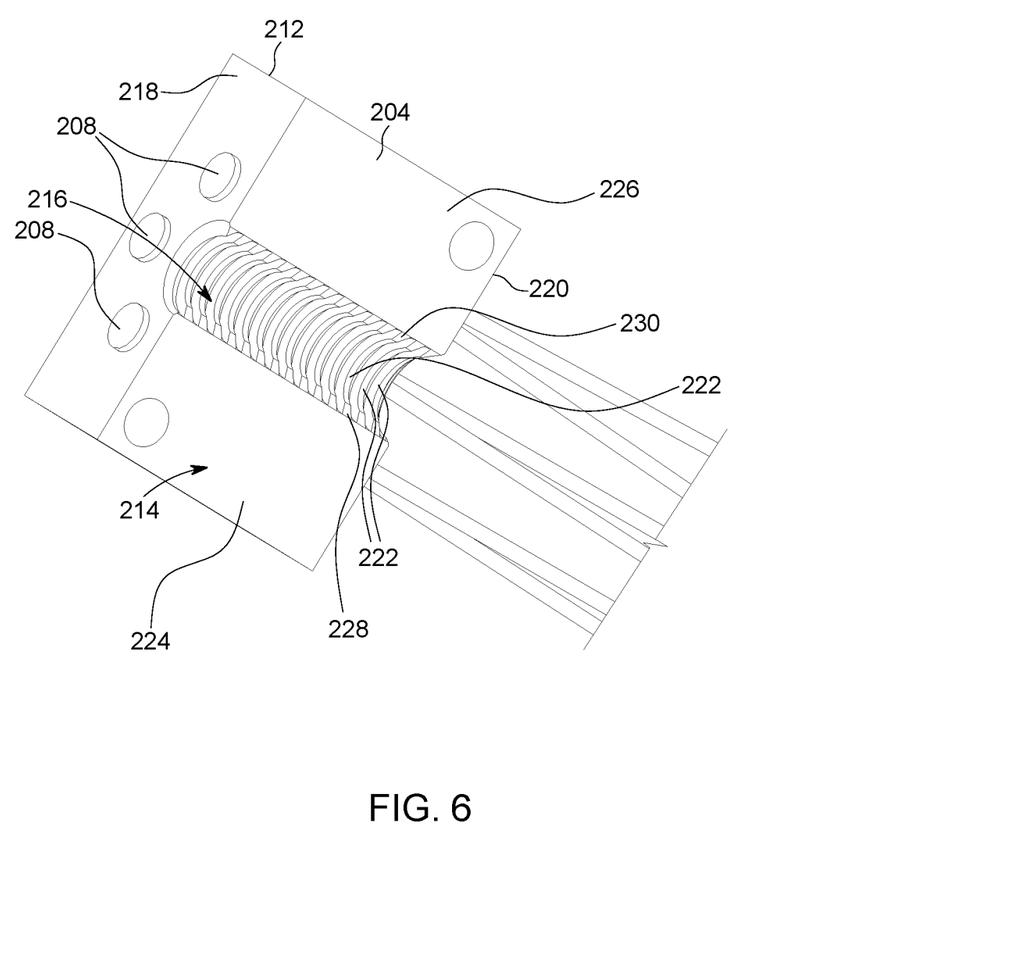
FIG. 6 depicts a first die portion of the die assembly of FIG. 5, according to an embodiment of the disclosure.

As shown in FIG. 5, a die assembly 200 includes a die 202 having two die halves, for example, a first die portion 204 and a second die portion 206, and a plurality of heaters 208 embedded in the die portions 204, 206. The heaters 208 may be electrical heaters and may extend along a length of the die portions 204, 206. The first die portion 204 and the second die portion 206 are similar in structure and function, and therefore, for the sake of clarity and brevity, a structure of only the first die portion 204 is explained in detail. As shown in FIG. 5 and FIG. 6, the first die portion 204 includes a body 212 having a first surface 214 defining a semi-cylindrical cut-out 216 extending from a first longitudinal end 218 to a second longitudinal end 220. Further, the first die portion 204 includes a plurality of semi-circular protrusions 222 arrayed linearly from the first longitudinal end 218 to the second longitudinal end 220. The protrusions 222 are arranged inside the cut-out 216 such that each protrusion extends in a semi-circular configuration along the first surface 214 of the first die portion 204 round a central axis of the cut-out 216. Further, each protrusion 222 extends radially inwardly direction from the first surface 214. Moreover, each protrusion 222 includes two lateral ends that interface with corresponding flat portions 224, 226 of the first die portion 204. The flat portions 224, 226 are arranged on two sides of the cut-outs 216. At the interface of each protrusion 222 with a first flat portion 224, the protrusion 222 includes a first chamfer 228, and a second chamfer 230 is defined at the interface to the protrusion 222 with a second flat portion 224.

For forming the grooves 130 and/or the anti-rotation structures 132 on the cable jacket 122, the first die portion 204 and the second die portion 206 are pressed together after positioning the cable inside the cut-outs 216, and heaters 208 are switched on and/or remain on. In one embodiment, a controller may control the heaters 208 and maintain the temperature of heaters 208 to a value that causes a partial melting or softening of the cable jacket 122. Upon partial melting or softening of the cable jacket 122 or otherwise, the die portions 204, 206 may be pressed, causing the protrusions 222 to extend inside the cable jacket 122 and forming the grooves 130. Further, due to the presence of chamfers 228, 230 of the first die portion 204, and chamfers of the second die portion 206, the anti-rotation ridges 132 are formed. Although the formation of the grooves 130 as the retention structures 126 is explained, it may be appreciated that any other type of retention structures 126 may be formed using a die assembly having corresponding structural features. Although die 202 having two halves 204, 206 are shown and contemplated, it may be appreciated that die 202 may include more than two halves, for example, four halves.

After forming the retention structures 126 on the cable jacket 122, the sleeve 116 is formed by molding the sleeve 116 on the cable jacket 122 using the appropriate die or mold. In an embodiment, the sleeve 116 may be molded over the cable jacket 122 by an injection molding technique. It may be appreciated that the engagement structures 152 (i.e., the protrusions 154) of the sleeve 116 are formed as the material flows inside the retention structures 126 (i.e., grooves 130) of the cable jacket 122 during molding of the sleeve 116 over the cable jacket 122.

Figure 7A:
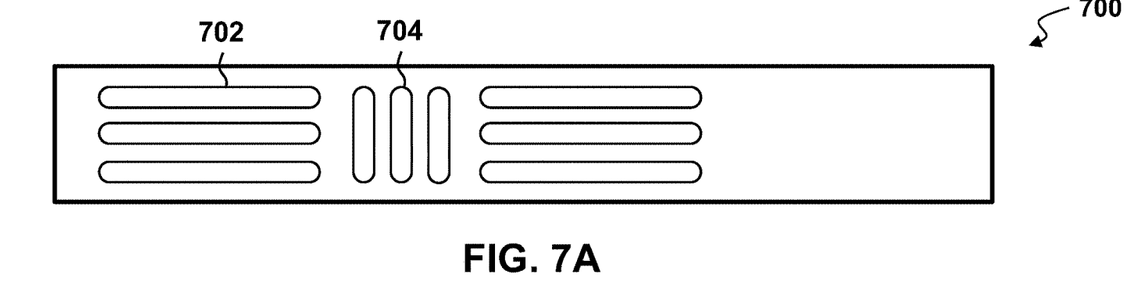
FIGS. 7A-7C depict various retention structure on electric cables, according to several embodiments of the disclosure.
Figure 7B:
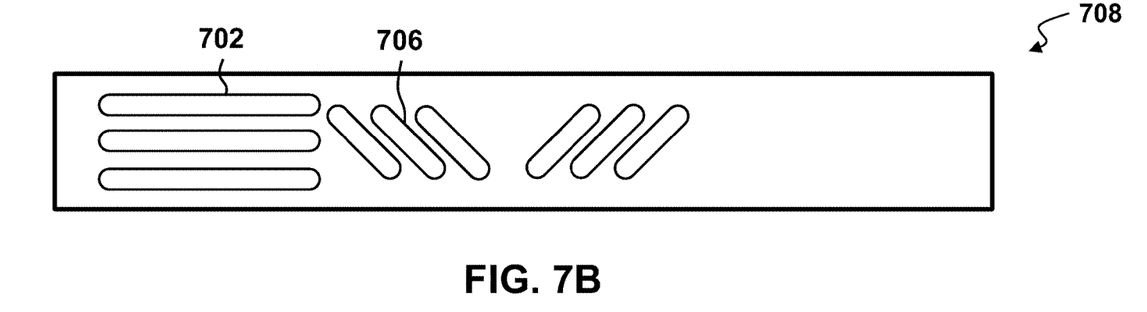
Figure 7C:
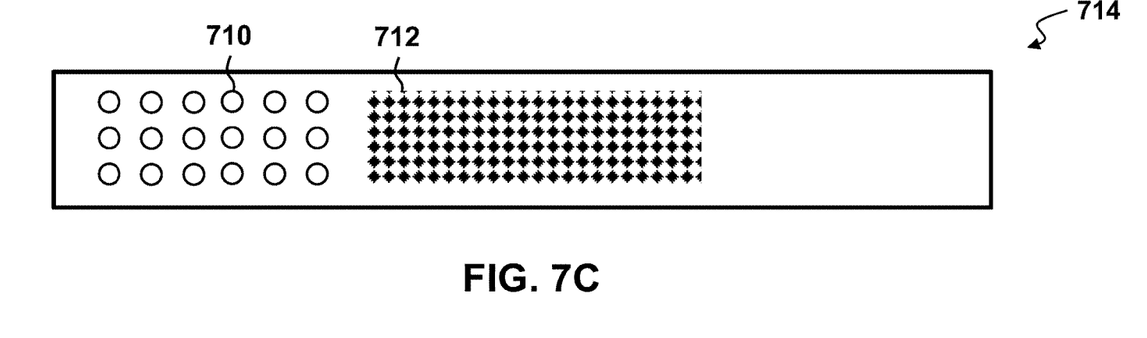

FIGS. 7A-7C depict various retention structures on electric cables 700, 708, 714, according to several embodiments of the disclosure. Retention structures may include dimples, linear grooves arrayed circularly around a central axis of the cable and extending in a longitudinal direction, indentations, spiral grooves, valleys, knurled surface, or any other suitable structures or features defined on the outer surface that facilitates positive retention and securing of the over-molded sleeve with the cable jacket.

FIG. 7A depicts an electric cable 700 with a mix of retention structures extending in a longitudinal direction 702 and retention structures extending in a transverse direction 704. This mix of retention structures 702, 704 inhibits separation of a cable jacket molded over the electric cable 700 via pulling apart as well as rotation. The arrangement of retention structures 702, 704 on the electric cable 700 is only shown for illustration and other variations of retention structures are possible and contemplated.

FIG. 7B depicts an electric cable 708 with a mix of retention structures extending in a longitudinal direction 702 and retention structures extending in an angled direction 704. This mix of retention structures 702, 706 inhibits separation of a cable jacket molded over the electric cable 708 via pulling apart as well as rotation. The arrangement of retention structures 702, 706 on the electric cable 708 is only shown for illustration and other variations of retention structures are possible and contemplated.

FIG. 7A depicts an electric cable 714 with a mix of retention structures having indentations 710 and retention structures including a texture surface 712. In some embodiments, the textured surface 712 may include a knurled surface, one or more dimpled, one or more grooves, or the like. This mix of retention structures 710, 712 inhibits separation of a cable jacket molded over the electric cable 714 via pulling apart as well as rotation. The arrangement of retention structures 710, 712 on the electric cable 714 is only shown for illustration and other variations of retention structures are possible and contemplated.

Figure 8A:
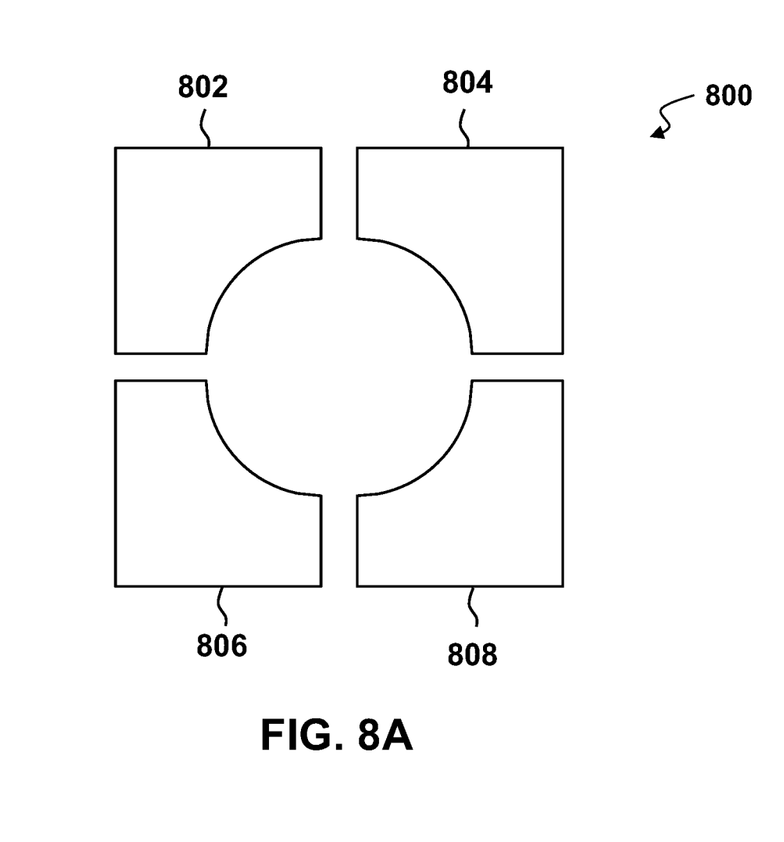
FIG. 8A depicts a die having four pieces, according to an embodiment of the disclosure.

FIG. 8A depicts a die 800 having four pieces 802, 804, 806, 808, according to an embodiment of the disclosure. The die 800 may have any number of parts, such as one, two, three, four, and the like. The four parts 802, 804, 806, 808 of the die 800 may be placed about a portion of an electrical cable so as to create one or more retention structures on the portion of the electrical cable. In some embodiments, the die 800 having four pieces 802, 804, 806, 808 may accommodate cables having varying thickness such that the die does not cover an entire circumference of the electrical cable. In other embodiments, the four pieces 802, 804, 806, 808 of the due 800 may connect together so as to completely encircle the electrical cable.

Figure 8B:
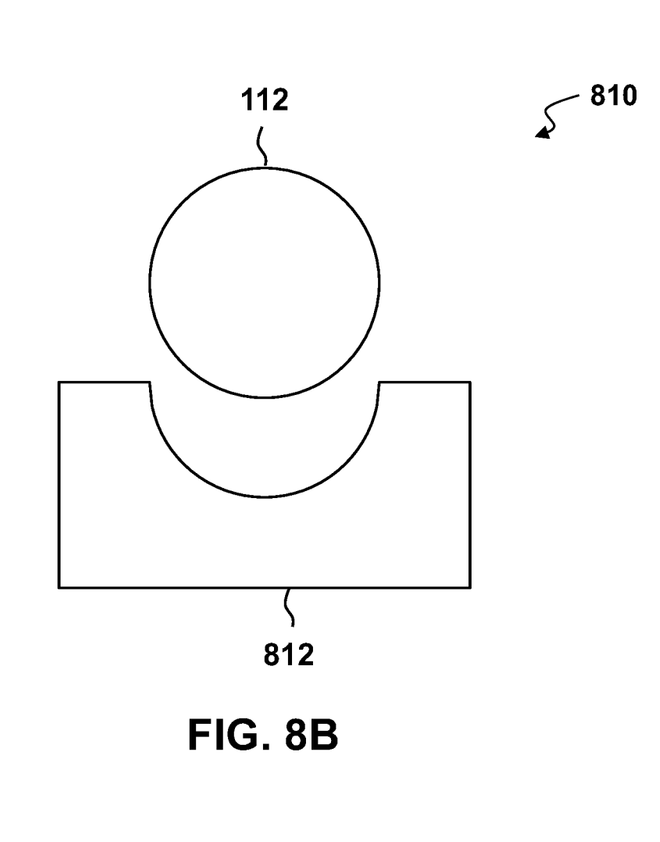
FIG. 8B depicts a die having a single piece, according to an embodiment of the disclosure.

FIG. 8B depicts a die 810 having a single piece 812, according to an embodiment of the disclosure. In some embodiments, the due 810 may be a single piece 812. In some embodiments, the die 810 may only be used to create one or more retention structures on a portion of a cable jacket of an electrical cable 112, such as half of a cable jacket. By way of example, the electrical cable 112 may be placed into the die 810 and the one or more retention structures may be created on the portion of the electrical cable 112 that is in contact with the die 810. In other embodiments, the cable 112 may be rotated such that one or more retention structures are created only on a portion of the cable jacket of the cable 112 during each connection between the die 810 and the cable 112. For example, the cable 112 may be placed in a single piece 812 of the die 810, rotated 90 degrees, and the cable 112 may be placed back in the single piece 812 of the die 810 in order to cover an entire circumference of the cable 112 with the one or more retention structures.

Figure 9:
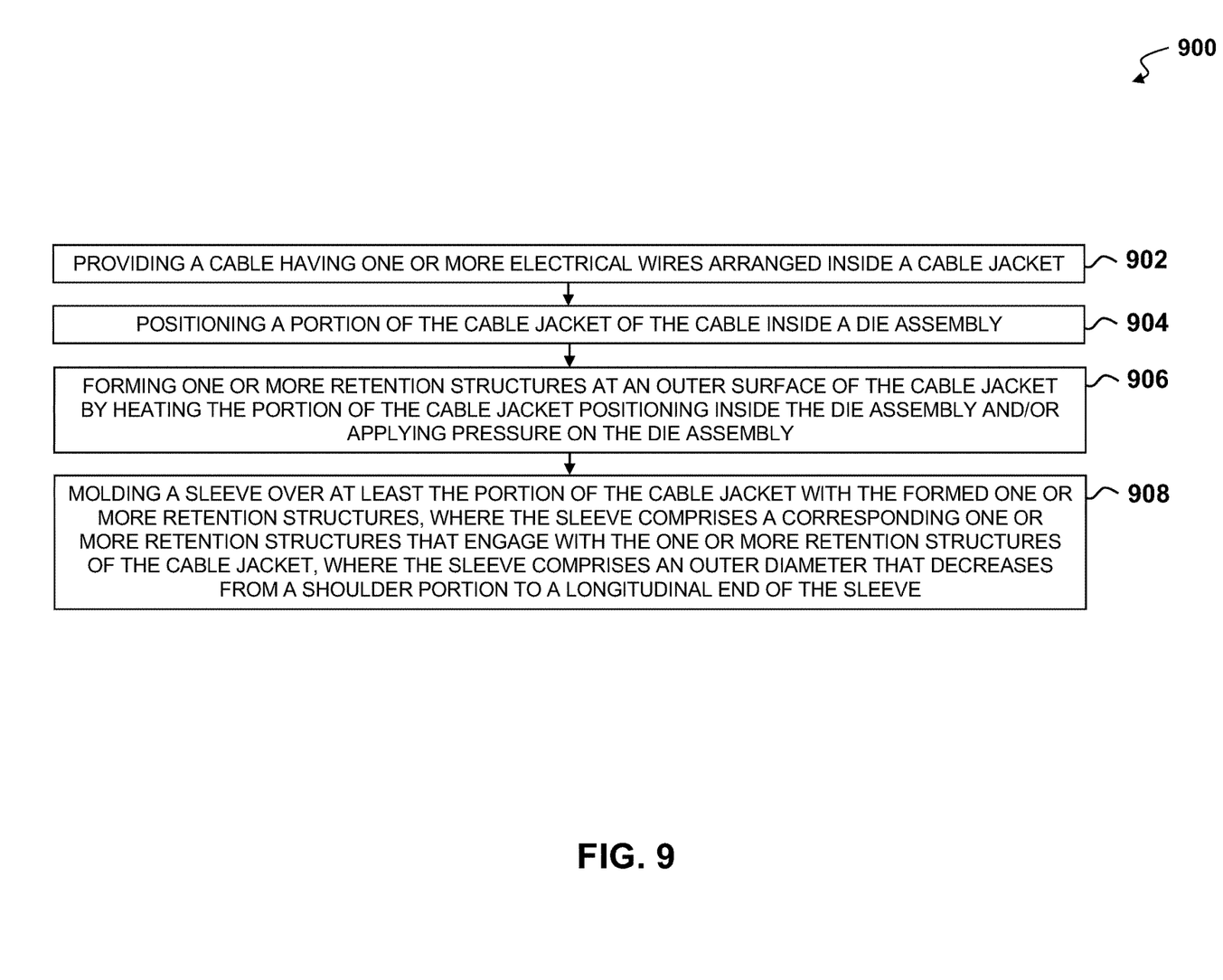
FIG. 9 depicts a flow chart of a method embodiment for forming an electric cable assembly, according to an embodiment of the disclosure.

FIG. 9 depicts a flow chart of a method embodiment 900 for forming an electric cable assembly, according to an embodiment of the disclosure. The method 900 may include providing a cable having one or more electrical wires arranged inside a cable jacket (step 902). The number of electrical wires may vary. The cable jacket material may be suitable for the creation of one or more retention structures. The method 900 may then include positioning a portion of the cable jacket of the cable inside a die assembly (step 904). In some embodiments, the portion of the cable jacket may include an end of a cable or proximate an end of the cable. The method 900 may then include forming one or more retention structures at an outer surface of the cable jacket by heating the portion of the cable jacket positioning inside the die assembly and/or applying pressure on the die assembly (step 906). The method 900 may then include molding a sleeve over at least the portion of the cable jacket with the formed one or more retention structures (step 908). The sleeve may have a corresponding one or more retention structures that engage with the one or more retention structures of the cable jacket. The sleeve may have an outer diameter that decreases from a shoulder portion to a longitudinal end of the sleeve. In some embodiments, the sleeve may not have any corresponding retention structures. In some embodiments, the sleeve may form into the one or more retention structures of the cable jacket due to compression of the sleeve against the cable jacket. The sleeve may be compressed against the cable jacket when the cable is inserted into a small opening or aperture, such as a housing.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. An electric cable assembly, comprising:
an electric cable having a cable jacket and one or more electrical wires extending through the cable jacket, the cable jacket defining one or more retention structures arranged at an outer surface of the cable jacket, wherein the one or more retention structures are one or more grooves arrayed along a length of the cable jacket, and wherein each groove extends circularly around a central axis of the cable; and
a sleeve adapted to connect to an electrical connector and surrounding the cable jacket in an area outside the electrical connector, the sleeve including one or more engagement structures engaged with the one or more retention structures, wherein the engagement of the one or more retention structures with the one or more engagement structures facilitates a retention of the sleeve with the cable jacket, and wherein the cable jacket includes one or more anti-rotational structures extending inside the one or more grooves to restrict a rotation of the sleeve relative to the cable jacket.

2. The electric cable assembly of claim 1, wherein the one or more engagement structures are one or more protrusions arrayed along a length of the sleeve, wherein each protrusion extends inside an associated groove.

3. The electric cable assembly of claim 1, wherein the one or more anti-rotational structures are arranged inside each groove.

4. The electric cable assembly of claim 1, wherein the sleeve is formed by molding the sleeve over the cable jacket.

5. The electric cable assembly of claim 1, wherein the sleeve is made of thermoplastic elastomeric material.

6. The electric cable assembly of claim 1, wherein the one or more retention structures is provided on the cable jacket by a hot stamping process.

7. The electric cable assembly of claim 1, wherein the sleeve is configured to restrict bending of the electric cable beyond a minimum bend radius.

8. The electric cable assembly of claim 1, wherein the one or more anti-rotational structures comprise one or more anti-rotational ridges disposed inside each groove.

9. The electric cable assembly of claim 8, wherein the one or more anti-rotational ridges comprise two anti-rotational ridges that bifurcate each groove into a first grove section and a second groove section.

10. The electric cable assembly of claim 1, wherein two of the one or more anti-rotational structures are arranged diametrically opposite to each other.

\* \* \* \* \*